United States Patent
Tiwari et al.

(10) Patent No.: US 7,904,067 B1
(45) Date of Patent: Mar. 8, 2011

(54) METHOD AND APPARATUS FOR ENABLING CALL ORIGINATOR TO SELECT A NOTIFICATION ON A TELECOMMUNICATIONS DEVICE

(75) Inventors: Abhishek Tiwari, Santa Cruz, CA (US); Andrew Brett Gilmer, Coral Springs, FL (US)

(73) Assignee: Syniverse ICX Corporation, Tampa, FL (US)

( * ) Notice: Subject to any disclaimer, the term of this patent is extended or adjusted under 35 U.S.C. 154(b) by 25 days.

(21) Appl. No.: 11/013,625

(22) Filed: Dec. 15, 2004

(51) Int. Cl.
*H04M 3/42* (2006.01)

(52) U.S. Cl. ..... 455/415; 455/413; 455/567; 379/142.04

(58) Field of Classification Search .............. 455/415, 455/412.1–412.2, 413, 414.1, 466, 567, 566, 455/563; 379/142.06, 245, 88.12, 142.08, 379/142.04, 88.13
See application file for complete search history.

(56) References Cited

U.S. PATENT DOCUMENTS

| | | | | |
|---|---|---|---|---|
| 5,526,406 A | * | 6/1996 | Luneau | 455/563 |
| 5,559,860 A | * | 9/1996 | Mizikovsky | 455/413 |
| 5,659,604 A | * | 8/1997 | Beckmann | 379/32.01 |
| 5,742,905 A | * | 4/1998 | Pepe et al. | 455/461 |
| 5,883,943 A | * | 3/1999 | Siddiqui | 379/142.02 |
| 6,084,951 A | * | 7/2000 | Smith et al. | 379/93.17 |
| 6,226,367 B1 | * | 5/2001 | Smith et al. | 379/142.04 |
| 6,347,225 B1 | * | 2/2002 | Nishiyama | 455/412.1 |
| 6,418,307 B1 | * | 7/2002 | Amin | 455/413 |
| 6,711,402 B1 | * | 3/2004 | Chelliah et al. | 455/415 |
| 6,738,615 B1 | * | 5/2004 | Chow et al. | 455/415 |
| 6,757,360 B1 | * | 6/2004 | Tolopka | 379/67.1 |
| 6,931,117 B2 | * | 8/2005 | Roberts et al. | 379/215.01 |
| 6,947,738 B2 | * | 9/2005 | Skog et al. | 455/426.1 |
| 6,990,332 B2 | * | 1/2006 | Vihinen | 455/414.1 |
| 7,127,237 B2 | * | 10/2006 | Naruse et al. | 455/415 |
| 7,197,135 B1 | * | 3/2007 | Silver et al. | 379/373.02 |
| 7,230,531 B2 | * | 6/2007 | Vronay | 340/539.2 |
| 7,257,210 B1 | * | 8/2007 | Henderson | 379/142.04 |
| 7,263,179 B2 | * | 8/2007 | Sammon et al. | 379/88.21 |
| 7,280,646 B2 | * | 10/2007 | Urban et al. | 379/142.01 |
| 7,634,656 B2 | * | 12/2009 | Pearson | 713/168 |
| 7,653,373 B2 | * | 1/2010 | Yamamori | 455/403 |
| 2003/0100295 A1 | * | 5/2003 | Sakai et al. | 455/415 |
| 2003/0139172 A1 | * | 7/2003 | Lampela et al. | 455/415 |
| 2004/0208301 A1 | * | 10/2004 | Urban et al. | 379/142.17 |
| 2005/0101302 A1 | * | 5/2005 | Vogedes et al. | 455/412.2 |
| 2005/0143103 A1 | * | 6/2005 | Bjorgan et al. | 455/466 |
| 2006/0052091 A1 | * | 3/2006 | Onyon et al. | 455/415 |
| 2009/0034704 A1 | * | 2/2009 | Ashbrook et al. | 379/142.04 |
| 2010/0208876 A1 | * | 8/2010 | Tsuei | 379/142.04 |

\* cited by examiner

*Primary Examiner* — Sharad Rampuria
(74) *Attorney, Agent, or Firm* — Blakely, Sokoloff, Taylor & Zafman, LLP; Judith A. Szepesi

(57) ABSTRACT

A method and apparatus for providing a call originator to select a notification a recipient sees or hears accompanying an incoming call.

22 Claims, 10 Drawing Sheets

METHOD AND APPARATUS FOR ENABLING CALL ORIGINATOR TO SELECT A NOTIFICATION ON A TELECOMMUNICATIONS DEVICE

FIELD OF THE INVENTION

The present invention relates to telecommunication networks, more specifically, to notification on a telecommunications device.

BACKGROUND

Communication networks currently support notification features like caller ID and ringtones. Currently, the format of the call notification is determined by the communication network or the recipient's system. The recipient can select different ringtones and images as a way of identifying individual callers. The recipient can select a default ringtone for all incoming calls, or select different ringtones for individual originating numbers. Caller ID is displayed as either the phone number of the call originator or the name associated with the phone number in the recipient's phone book. Visual notifications are usually photos taken by the camera feature of the recipient's device and displayed when the particular individual calls the recipient.

SUMMARY OF THE INVENTION

The present invention allows a call originator to select a notification a recipient sees or hears accompanying an incoming call.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for sending call originator selected notifications is described. This notification may include visual notification—such as a photograph, an icon, a video, or a moving image—and audio notification—such as a ring-tone, an announcement, or a spelling of the caller's name—, or a combination of the above.

Figure 1:
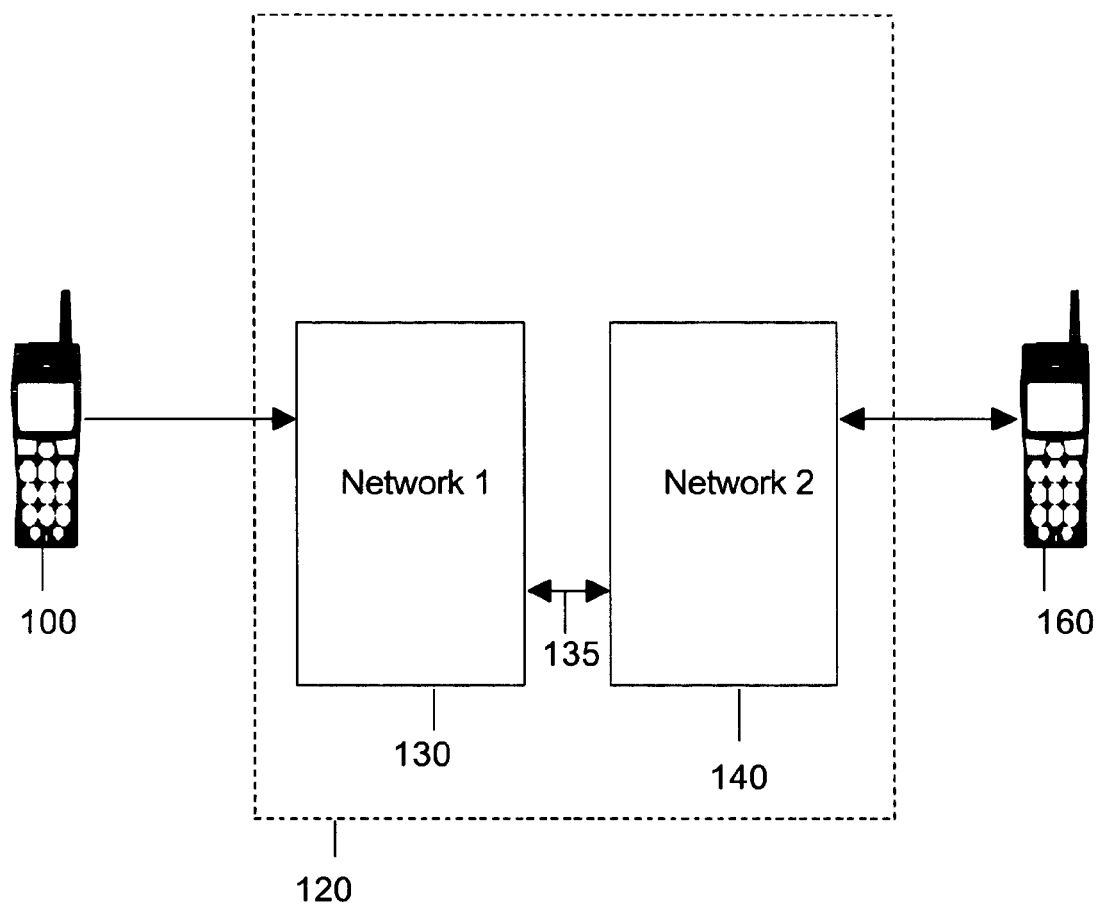
FIG. 1 illustrates an exemplary mobile communication network.

FIG. 1 illustrates one embodiment of a mobile communication network, consisting of at least one network 120 capable of enabling a connection between a call originator device 100 and a call recipient device 160. The mobile communication network 120 may consist of different mobile carriers 130 and 140, capable of communicating. The mobile communication network 120 may work using a central interface between mobile carriers 130, 140, or may rely on direct communications between these carriers 130, 140.

Figure 2:
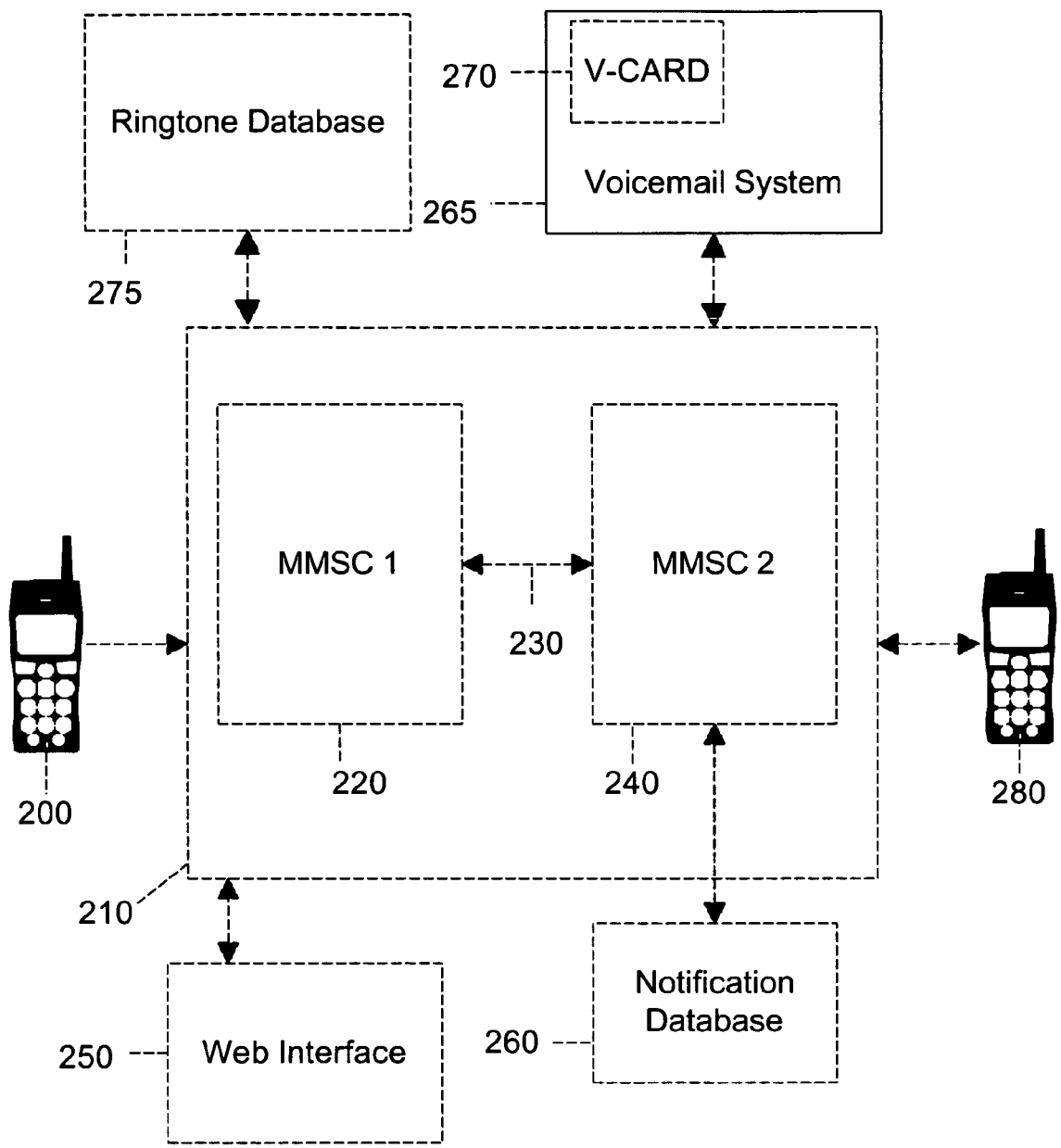
FIG. 2 is a block diagram illustrating one embodiment of a push-id network.

FIG. 2 illustrates a block diagram of a mobile communication network 210 consisting of Multimedia Messaging Service Centers (MMSCs) 220 and 240. In one embodiment, the present system works only within a single MMSC. In another embodiment, the system works even if the call originator 200 and call recipient 280 are on different MMSCs 220, 240. Mobile devices 200, 280 are coupled to their respective MMSCs 220, 240. The mobile devices 200, 280 may be various types of cellular telephones.

In one embodiment, a voicemail system 265 may be coupled to the call originator's MMSC 220. The voicemail system 265 may include the user's virtual card (v-card) 270. The v-card 270, in one embodiment, includes a recording of the user's name. For example, in voicemail systems, the user may have an announcement, in which the user's name is spoken, in the users' own voice. In one embodiment, this portion of the v-card 270 is used, in the present invention. Although the term "v-card" is used, alternative forms of existing recordings of the user's own announcement of his or her name may be used. For example, the user may have such a recording stored in another format. Thus, the term "v-card" in the present invention does not refer to a particular format, but rather to a preexisting recording of a user announcing his or her own name.

In one embodiment, the system further includes a notification database 260. In one embodiment, the notification database 260 is used to temporarily store call originator generated notifications. In one embodiment, the notification database 260 has entries selected by a caller, using his or her mobile device 200, 280, or a web interface 250. This is described in more detail below.

In one embodiment, notifications stored in the notification database 260 consist of one or more of the following: photos, animation, graphics, audio clips, or multimedia data. For example, an image can be a photo of the call originator. Images are not limited to any particular format. An example of a video can be a short clip of the call originator waving to the camera. Video clips are not limited to any particular format. In one embodiment, the MMSC 240 converts the image, video, audio, or other data of the notification into a format compatible with the recipient's mobile device 280, when sending the notification to the recipient's mobile device 280.

In one embodiment, the system is further linked to a ringtone database 275, which stores a plurality of ringtones. In one embodiment, the ringtone database 275 includes selectable ringtones. In one embodiment, the ringtones are available for download by any mobile device user. The ringtone database 275 supplies ringtones requested by any mobile device user to his/her mobile device. In one embodiment, the ringtone database 275 further stores the call originator selected ringtone, once it is downloaded to the recipient's system. In one embodiment, ringtones can be stored in any format compatible with the recipient's mobile device 280. For example, most current ringtones are in the MIDI format.

The voicemail system 265, notification database 260, and ringtone database 275 are illustrated as separate entities from the MMSC 220, 240. In another embodiment, they may be incorporated into the MMSC 220, 240. In another embodiment, the recording system 255, the voicemail system 265, the notification database 260, and the ringtone database 275 may also be incorporated into a single system. In one embodiment, the notification database 260 and ringtone database 275 may be alternative storage formats, and not actual databases.

Figure 3:
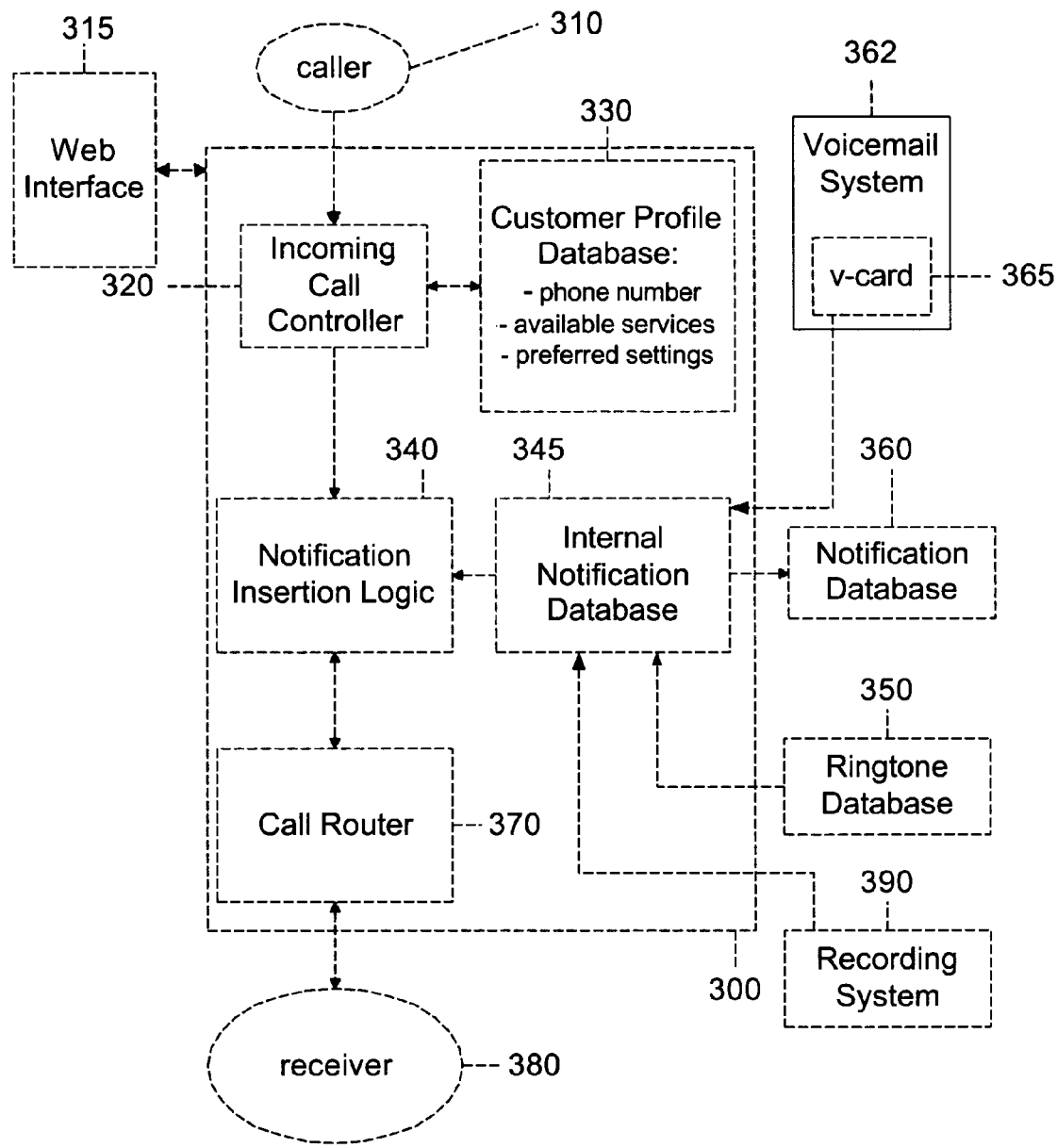
FIG. 3 illustrates one embodiment of the mobile communication network.

FIG. 3 illustrates one embodiment of a block diagram of a MMSC 300. As the call originator 310 places a call to a recipient 380, in one embodiment, the call is routed through the MMSC 300. The incoming call controller 320 receives the incoming call. In one embodiment, the incoming call controller 320 checks the customer profile database 330 maintained by the mobile communication network. In one embodiment, the customer profile database 330 includes a list of previously associated notifications and telephone numbers. In one embodiment, the customer profile 330 further includes additional information such as the customer's mobile user name and password, network features available to the customer, etc.

In one embodiment, when the incoming call controller 320 receives an incoming call, the controller 320 compares the call recipient's number to the call originator's customer profile in profile database 330. In one embodiment, the customer profile database 330 determines if there is a notification associated with the recipient's number. In one embodiment, the controller 320 determines only whether the caller has a notification designated for the receiver 380. In another embodiment, the controller 320 determines whether there are any outstanding notifications to be sent to recipient 380. In one embodiment, notifications are stored only under the recipient's telephone number. Since a connection to the recipient is established whenever a telephone call is made, the system automatically selects all outstanding notifications, and sends them to the recipient.

In one embodiment, the incoming call controller 320 searches in the database 330 with the recipient's number for an indication that there is an associated notification or notifications. In one embodiment, only those notifications that are not already resident on the recipient's system are stored in the database. In one embodiment, each notification has a unique ID. In one embodiment, the IDs are alphanumerical sequences. For example, a photo notification can have the ID of 4642134A.jgp. In one embodiment the notification ID is a concatenation of the recipient's telephone number and an ID, such that a single notification may have multiple unique IDs. In another embodiment, the IDs are not unique.

In one embodiment, if the recipient's telephone number is found to have a matching notification assigned to it, then this information is forwarded to notification insertion logic 340. In one embodiment, the information forwarded to the notification insertion logic 340 includes the number of the recipient and the ID of the notification. In another embodiment, the unique ID of the notification is passed to the notification insertion logic 340, and that unique ID identifies the notification as well as the recipient.

In one embodiment, the notification includes one or more of the available types of notification such as a voice, ringtone or image/video. In one embodiment, the notification insertion logic 340 retrieves voice, ringtone and image/video notification data from the internal notification database 345. In one embodiment, when a call originator initially assigns a notification, it is retrieved from its current location in a voicemail system 362, ringtone database 350, notification database 360, and/or recording system 390 and stored in the internal notification database 345 for rapid access. In one embodiment, each notification is stored as a file. In one embodiment, the internal notification database 345 stores all parts of a notification—whether audio or video—in a single concatenated file. In another embodiment, the notifications are stored separately. In another embodiment, there is no internal notification database 345, and the notification elements are stored in external systems—the voicemail system 362, the ringtone database 350, the notification database 360 and/or the recording system 390. In that embodiment, the notification insertion logic 340 retrieves the notifications from these external systems.

In one embodiment, each file has a unique address. For example <http://att.net/image/4642134A.jpg> is an exemplary address of an image file on the AT&T network. In one embodiment, the file name and address is not limited to any format or length unless dictated by the MMSC 300. In one embodiment, once the notification or notifications are retrieved, they are forwarded to the call router 370. In another embodiment, more information is combined with the location of the notification and then forwarded to the call router 370. Other information can include, but is not limited to, the identification of the call originator.

In one embodiment, the voicemail system 326 includes the user's v-card. The v-card 365, in one embodiment, includes a recording of the user's name. In one embodiment, the recording of the user's name is spoken in the user's own voice. In another embodiment, the recording of the user's name is computer generated.

The recording system 390 may include other voice recordings. For example, the user can record a notification, in his own voice, asking the recipient to answer the phone because it is urgent. The user can also record personal messages for individual recipients such as: "Hey mom, it's me Tom". In one embodiment, voice recordings can include background music similar to home answering machine greetings. Recording system 390 may be used to record or store any audio or video data, in one embodiment.

In one embodiment, the voice recording is recorded directly on the call originator's device. In one embodiment, the device is equipped with a digital recording feature enabling the device to function as a digital recorder. The call originator's device saves the voice recording and transfers it to the recording system 390, in one embodiment. In one embodiment, the recording file can be in any audio format supported by the user's device.

In one embodiment, the call originator device 310 can transfer the recording to the network in the form of a Multimedia Message Service message (MMS). In one embodiment, the recording may be transferred to the MMSC by placing a call into the recording system 390. In one embodiment, a recording can be directly recorded on the mobile communication network's recording system 390 and stored. In one embodiment, to directly record a voice notification, user calls a designated number and speaks into the phone. In one embodiment, the user can use any phone to access the recording system 390. In another embodiment, access to the recording system 390 is limited to only authorized devices. Authorized devices can include the call originator's mobile communication device. In one embodiment, this feature may be an add-on feature, available only to certain users. In one embodiment, use of this feature may require a password.

In an alternative embodiment, the voice recordings are first recorded onto another device and then transferred to the recording system 390. Other devices include, but are not limited to, computers and digital recorders. In one embodiment, the file may be transferred to the recording system 390 through the call originator device. In another embodiment, the file can be transferred to the recording system 390 using a web interface 315. The web interface 315 is described in more detail below.

The call router 370 receives the notification, and the recipient designation from the notification insertion logic 340, places the call to recipient device 380. Details of how the call is placed are described below. Alternatively, if recipient number is not associated with a special notification, no notification information is passed to the call router 370.

In an alternate embodiment, the call originator 310 can create a notification at the time he or she places the call, or without first passing the notification to the MMSC or any database. In this embodiment, the notification is not stored on the MMSC. In one embodiment, the notification is transferred to the MMSC 300 when the call is placed. The notification insertion logic 340 receives the information, along with the notification, from incoming call controller 320, and passes them directly on to the call router 370. In one embodiment, the incoming call controller 320 also places a copy of the notification in the database.

Figure 4:
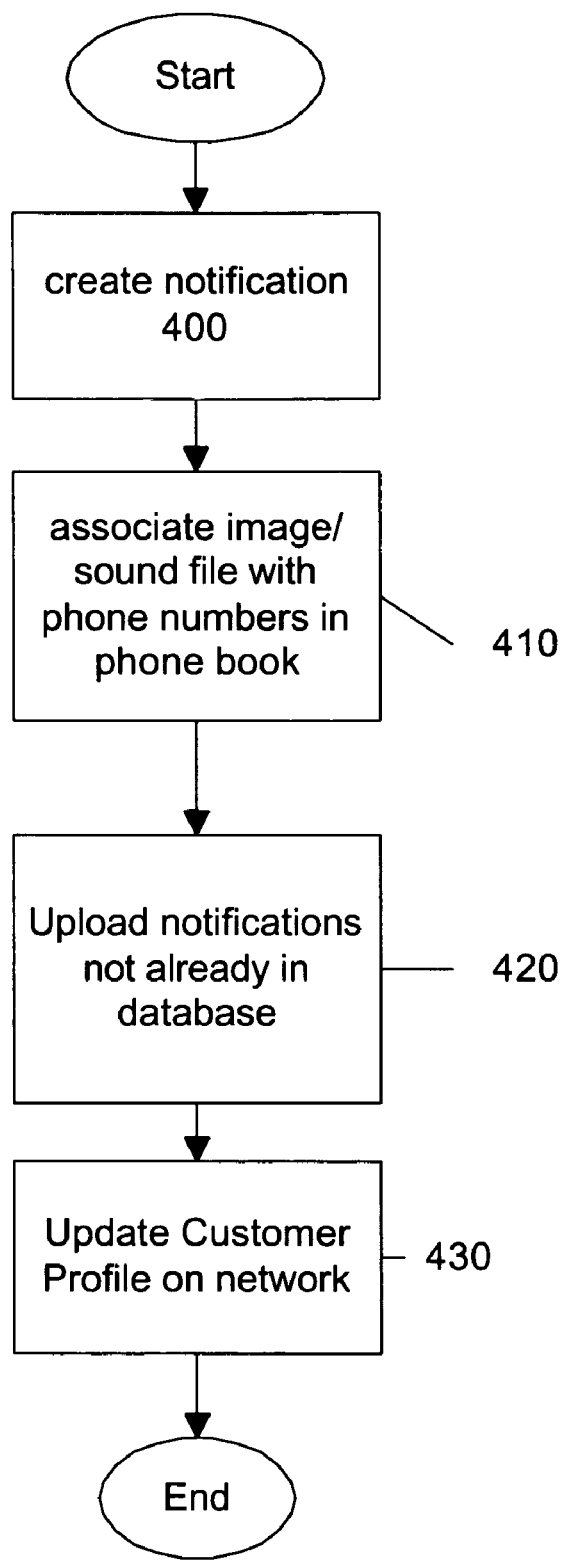
FIG. 4 illustrates one embodiment of the flow between call originator and mobile communication network when uploading notification from call originator device.

FIG. 4 illustrates one embodiment of the flow between a call originator and a mobile communication network when uploading a notification from the call originator device to the mobile communication network. In one embodiment, the notification is created on the call originator's mobile device. In another embodiment the notification is created on another device and transferred to the call originator device 400. Other devices can include, but not limited to, digital voice recorders and digital cameras. In one embodiment, transfer from other devices to the call originator device can be made with using any interfaces supported by the mobile device, such as Bluetooth, WiFi, USB, USBII, or any other connection. In one embodiment, the notification files are stored in the memory of the call originator device. In another embodiment, the notifications can be stored on the communication network.

In one embodiment, the call originator can associate one or more recipient's telephone numbers with a notification 410. In one embodiment, each phone number can be associated with more than one type of notification such as an image and a voice recording or a video and a ringtone. In one embodiment, once the call originator is done associating telephone numbers with notifications, the information is passed to the mobile communication network 420. In one embodiment, to send this information the call originator device communicates with the mobile communication network, uploads any new notifications, and updates the telephone number associations in the customer profile maintained by the network 430. The process then ends.

Figure 5:
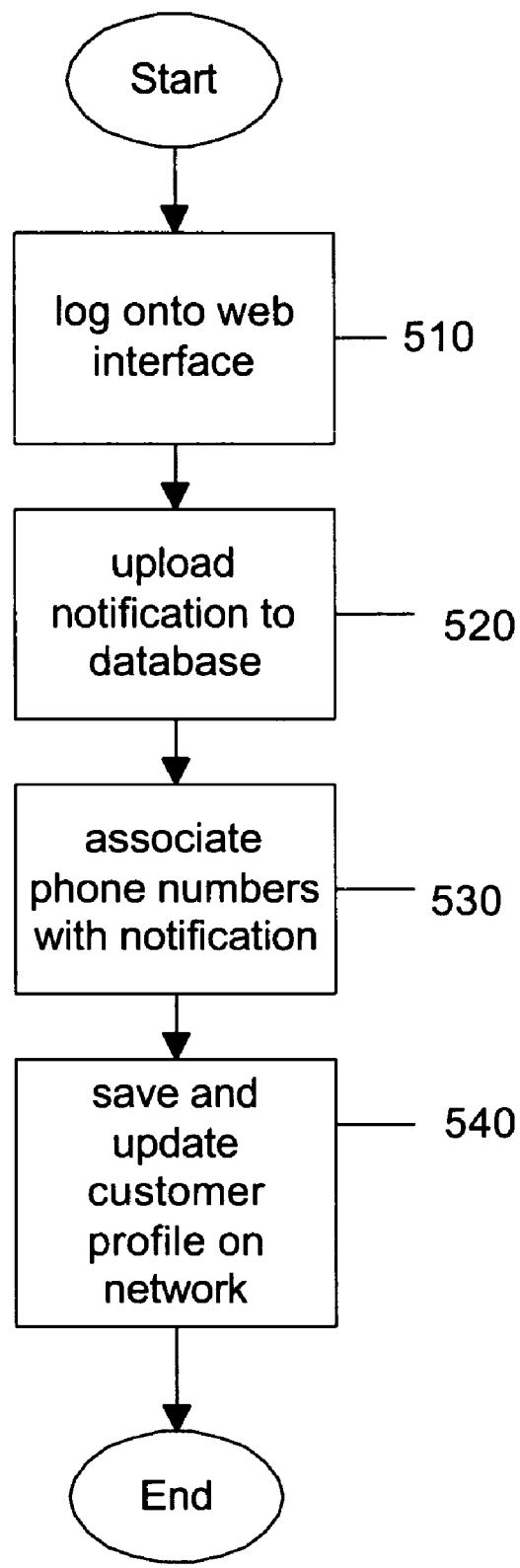
FIG. 5 illustrates one embodiment of the flow when notification is uploaded via a website.

FIG. 5 illustrates one embodiment of the flow when a notification is uploaded via a web interface. The call originator logs into the web interface 510. In one embodiment, the web interface is accessed via a web browser. In one embodiment, logging in requires a password or other authentication.

In one embodiment, once the call originator successfully logs into the web interface, the web interface offers several options. In one embodiment, the web interface offers options including uploading a new notification 520, changing recipients associated with an existing notification, or deleting a notification. In one embodiment, a new notification can be uploaded from any device capable of accessing the web interface. In one embodiment, once a new notification is uploaded, the user can associate recipients with the notification 530. In one embodiment, when the user is done associating the notification with recipients, the changes are updated to the customer profile maintained on the mobile communication network 540. In one embodiment, the updating occurs when the user logs out from the web interface.

Figure 6:
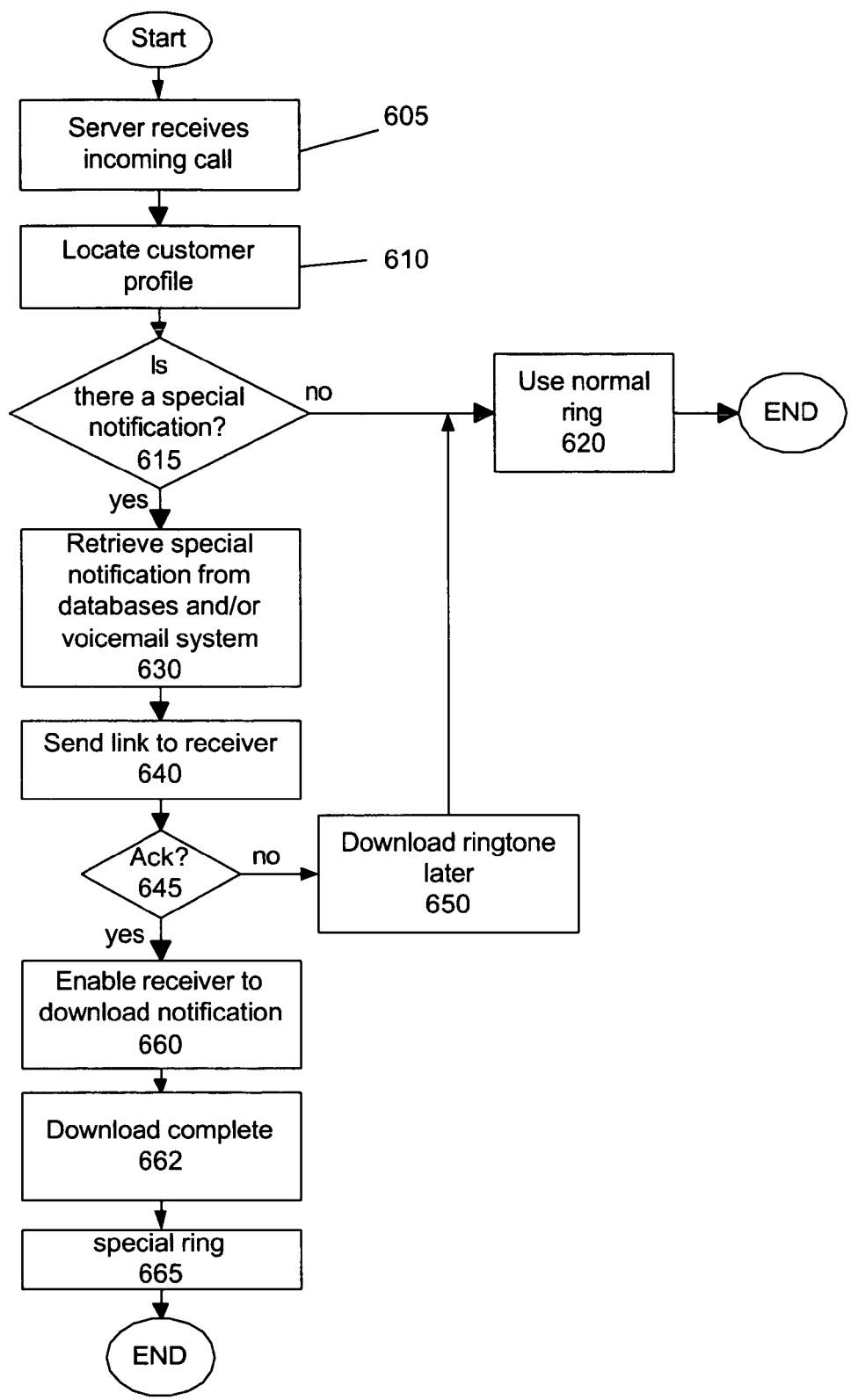
FIG. 6 illustrates one embodiment of the flow once the call originator places a call on the mobile communication network.

FIG. 6 illustrates one embodiment of the flow once the call originator places a call on the mobile communication network. The network receives the incoming call from the call originator at block 605. In one embodiment, the network looks up the recipient and determines whether there is a notification associated with the recipient. If there is no notification, at block 615, the process continues to block 620, and the normal notification is used. The process then terminates.

If there is a notification with the recipient, at block 615, the network retrieves the notification at block 630. At block 640, in one embodiment, a notice is sent to the call recipient indicating that a customized notification should be downloaded. In one embodiment, the notice is sent as a Short Message Service (SMS) message. The process determines whether an acknowledgement is received. The acknowledgement, shown at block 645, in one embodiment indicates that the users system can download the notification in time to use the notification as the announcement for the incoming call.

If the acknowledgement is not received, the process continues to block 650. At block 650, in one embodiment, the system sets up a download of the notification for a later time. In one embodiment, the acknowledgement may not be received because the recipient has set his or her phone to reject such custom notifications. In that case, the download is not set up. The process then continues to block 620, to use the standard ring tone for this call.

If an acknowledgement is received, at block 660, the receiver is enabled to download the notification. In one embodiment, the original notice provides a Universal Resource Locator, or alternative indicator, from which the recipient can download the notification. At block 662, the notification is transferred from the network to the recipient device. In another embodiment, if the recipient accepts the call originator selected notification, the recipient will hear or see the call originator selected notification 665, notifying the recipient of an incoming call. In one embodiment, the notification is then stored on the recipient's device for later use.

Figure 7:
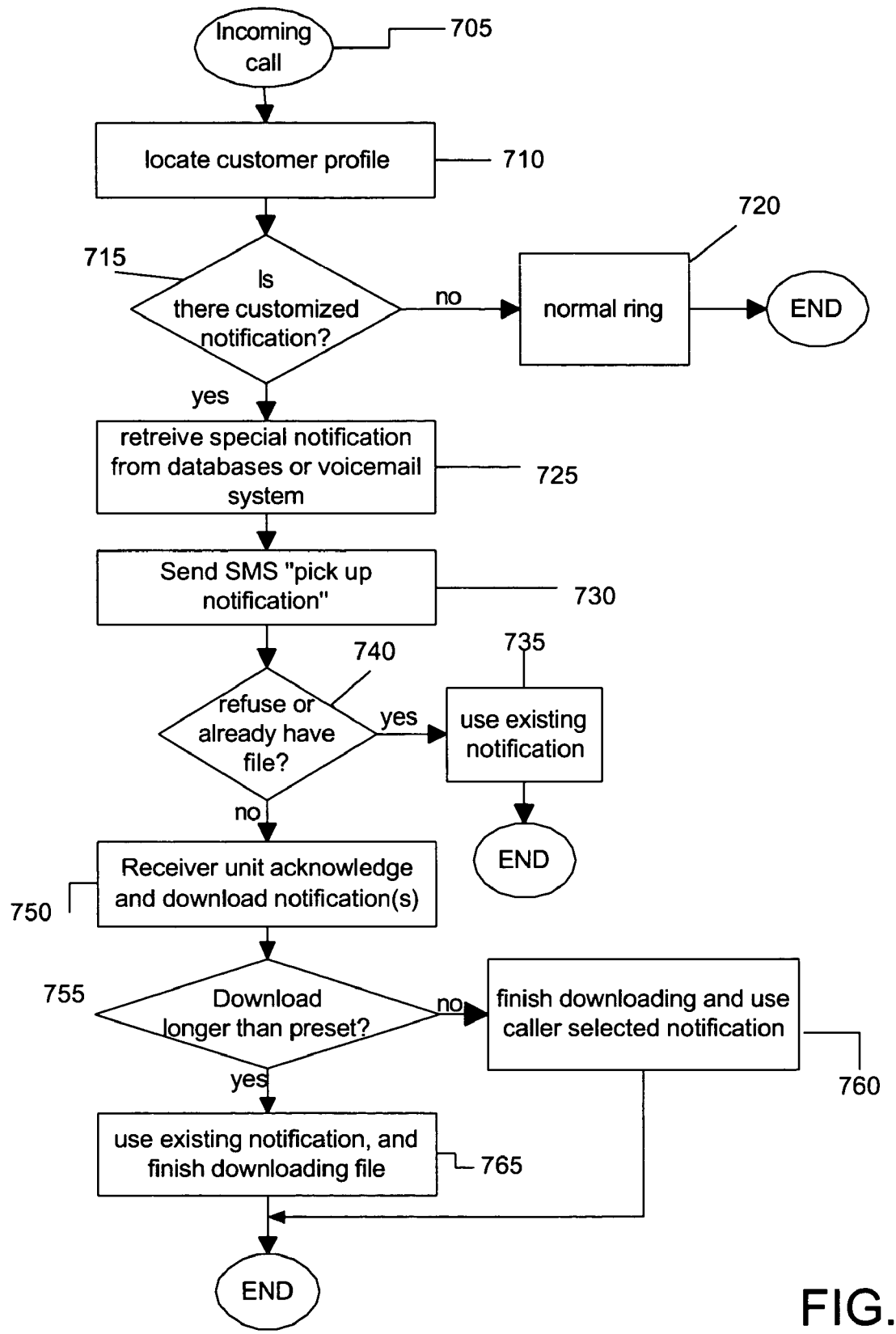
FIG. 7 illustrates an alternative embodiment of the flow of FIG. 6, when the transfer rate between mobile communication network and the call recipient is too slow.

FIG. 7 illustrates an alternative embodiment of the FIG. 6 where the transfer rate between mobile communication network and the call recipient might be too slow to transfer the notification for the current call.

In one embodiment, a "pick up" message is sent, at block 730, to a recipient notifying of an incoming call with call originator selected notification. In one embodiment, this pick-up message may be an SMS message. In one embodiment, the custom notification begins to download when recipient acknowledges the "pick up" message, block 750. In one embodiment, the downloading of the notification does not add to a time gap between the placing of a call and the recipient's phone ringing. In one embodiment, to avoid a long lag time between placing the call and the time to complete the download of the notification to the recipient's device, the recipient device keeps track of the time elapsed since downloading began, at block 755. In one embodiment, if elapsed time exceeds a preset time, the recipient device will play the normal ring, while continuing to download the call originator notification, block 765. In one embodiment, if the download finishes before the preset time, then the call originator selected notification is displayed and/or played on the recipient device, at block 760.

Figure 8:
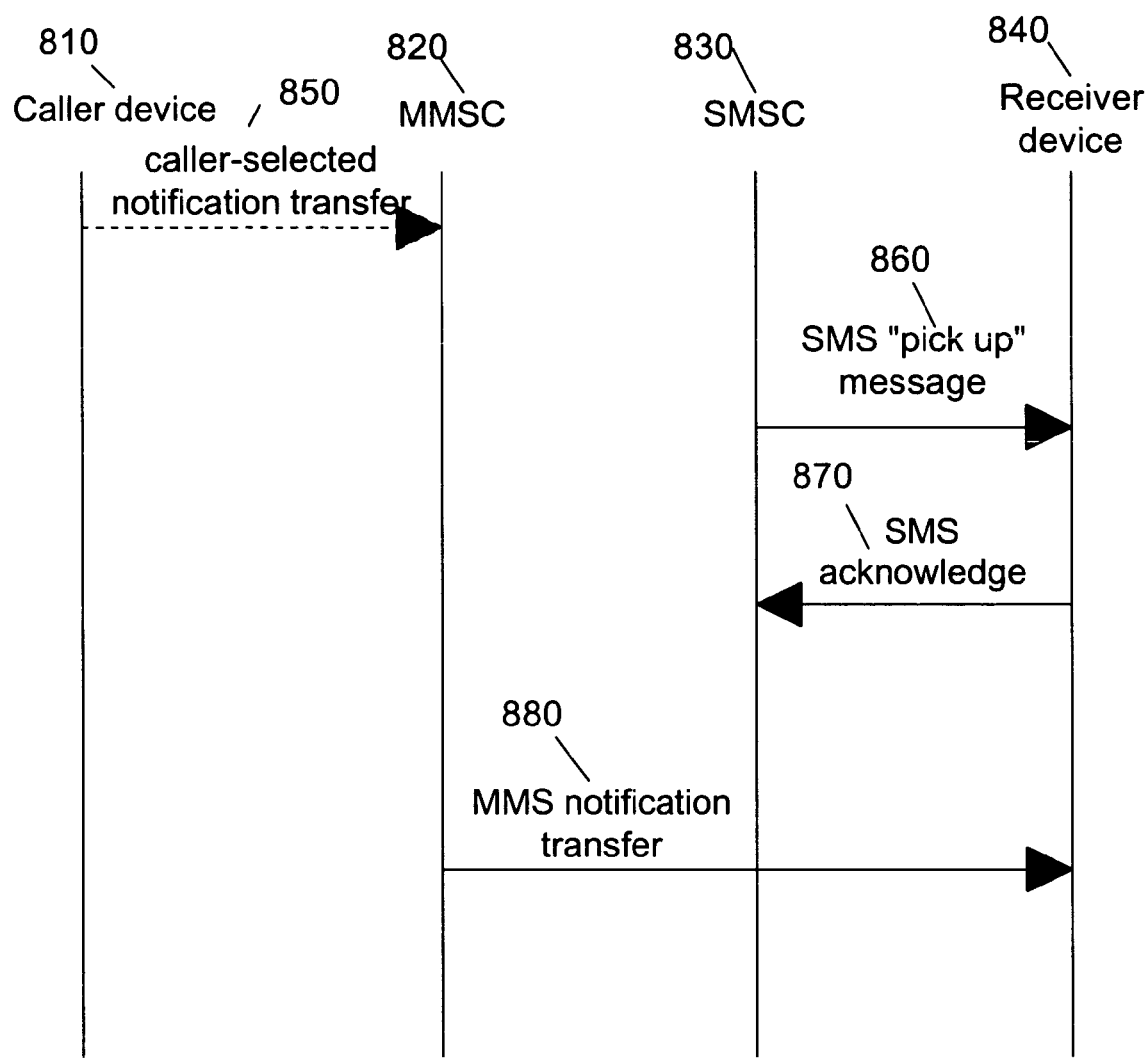
FIG. 8 illustrates one embodiment of the flow between the recipient and the mobile communication network.

FIG. 8 illustrates one embodiment of the flow between the recipient and the mobile communication network. In one embodiment, the call originator device 810 sends the call originator selected notification 850 to the mobile communication network 820. The mobile communication network sends a SMS 830 "pick up" message 860 to the recipient device 840. In one embodiment, the "pick up" message 860 informs the recipient device 840 of an incoming call with call originator selected notification 850. One embodiment of a "pick up" message 860 contains the location of the notification on the network.

An alternate embodiment of the "pick up" message 860 contains the location of the notification along with other information. In one embodiment, the recipient device 840 either replies with an acknowledgement 870 or replies with a rejection. In one embodiment, an acknowledgment means the recipient device does not have the notification in memory and wish to download it. In one embodiment, a rejection means either that the recipient device already has the notification in memory or the recipient does not want the notification. In one embodiment, the recipient can reject notification individually during each incoming call or preset the recipient device to reject all call originator selected notifications. In one embodiment, the mobile communication network receives the acknowledgment from the recipient and initiates a MMS transfer of the notification 880 to the recipient device 840. The notification in one embodiment is stored in the memory of the recipient device 840 for future use. The notification in another embodiment can be deleted from the recipient device 840.

Figure 9:
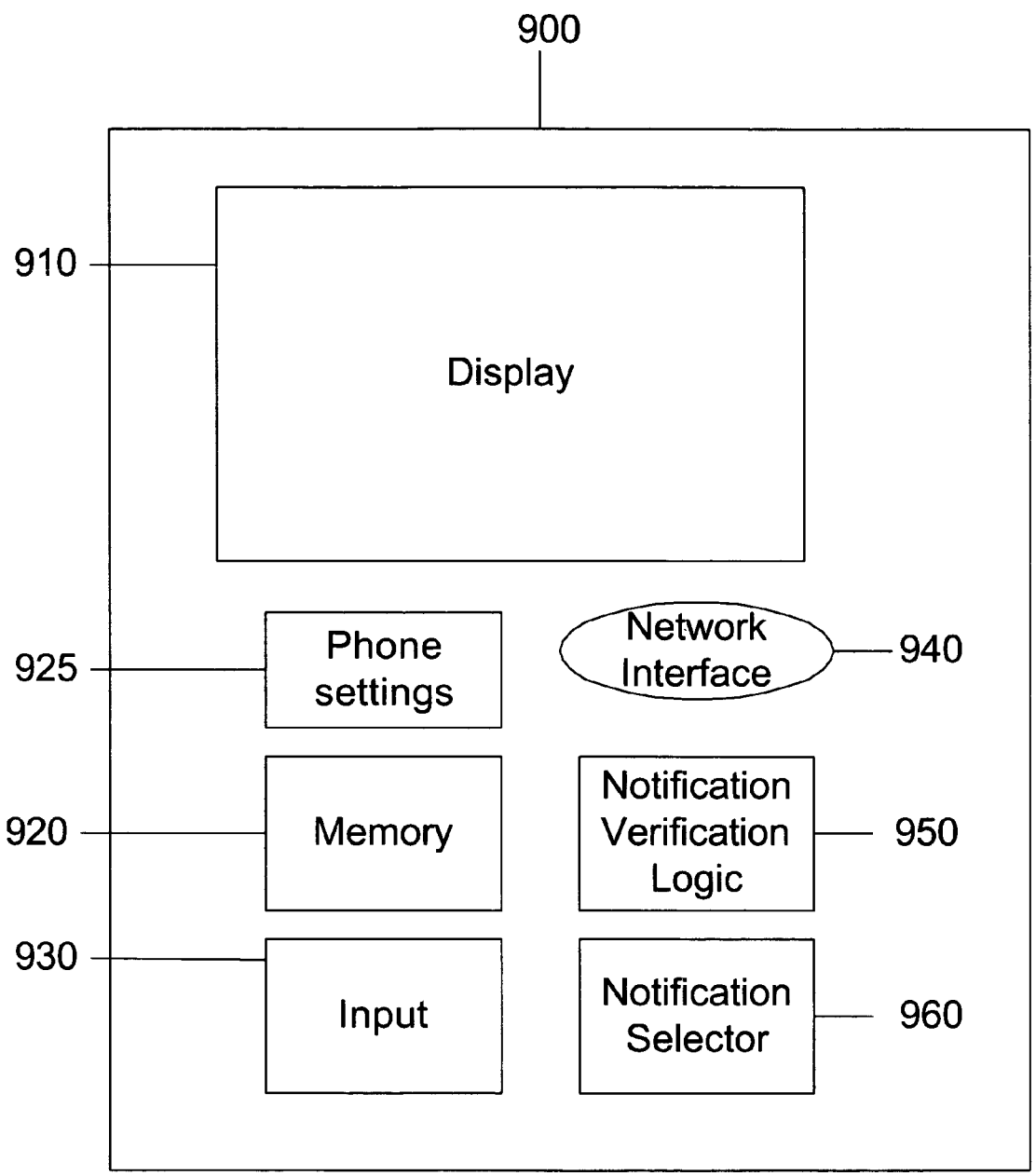
FIG. 9 illustrates one embodiment of the recipient device.

FIG. 9 illustrates one embodiment of the recipient device 900. In one embodiment, the device includes a display 910, a memory module 920, phone setting module 925, input device 930, a network interface 940 and a notification verification logic 950. In an alternate embodiment, the memory module 920, the notification verification logic 950 and phone settings module 925 may be combined. In one embodiment, the memory module 920 stores previously downloaded call originator selected notifications. In another embodiment, the memory module 920 stores various data not limited to call originator selected notifications. For example, in one embodiment, the memory module 920 stores the recipient's phone book, received text messages and downloaded items such as ringtones and wallpaper. In one embodiment, the memory module is part of to the device. In another embodiment, the memory module is a removable chip, such as a subscriber identity module (SIM) or flash memory card.

In one embodiment, the phone settings module 925 stores the phone settings such as the default ringtone and ring volume. In the current embodiment, the phone settings module 925 is separate from the memory module 920. In another embodiment, the two modules may be combined. In one embodiment, the network interface 940 communicates with the mobile communication network, and enables communication with other handsets via the communication network.

In one embodiment, the notification verification logic 950 determines whether the recipient device should download the call originator selected notification. Details of the notification verification logic are described below.

In one embodiment, the notification, once it is downloaded, is added to the address book entry associated with the user. In one embodiment, if the notification includes an image, the image may be used as the "photograph" associated with the address book entry. In another embodiment, the notification is stored linked to the address book. In another embodiment, the notification is stored separately. The separately stored notification may be linked to the address book.

In one embodiment, the user's device further includes a notification selector 960 to select a notification to use, when the device receives a call. The notification selector 960 determines whether there is a caller-originated notification in memory 920, or currently being downloaded by notification verification logic 950. If there is a caller-originated notification, which is available in a timely manner, the notification selector 960 uses the custom caller originated notification to announce the call.

Figure 10:
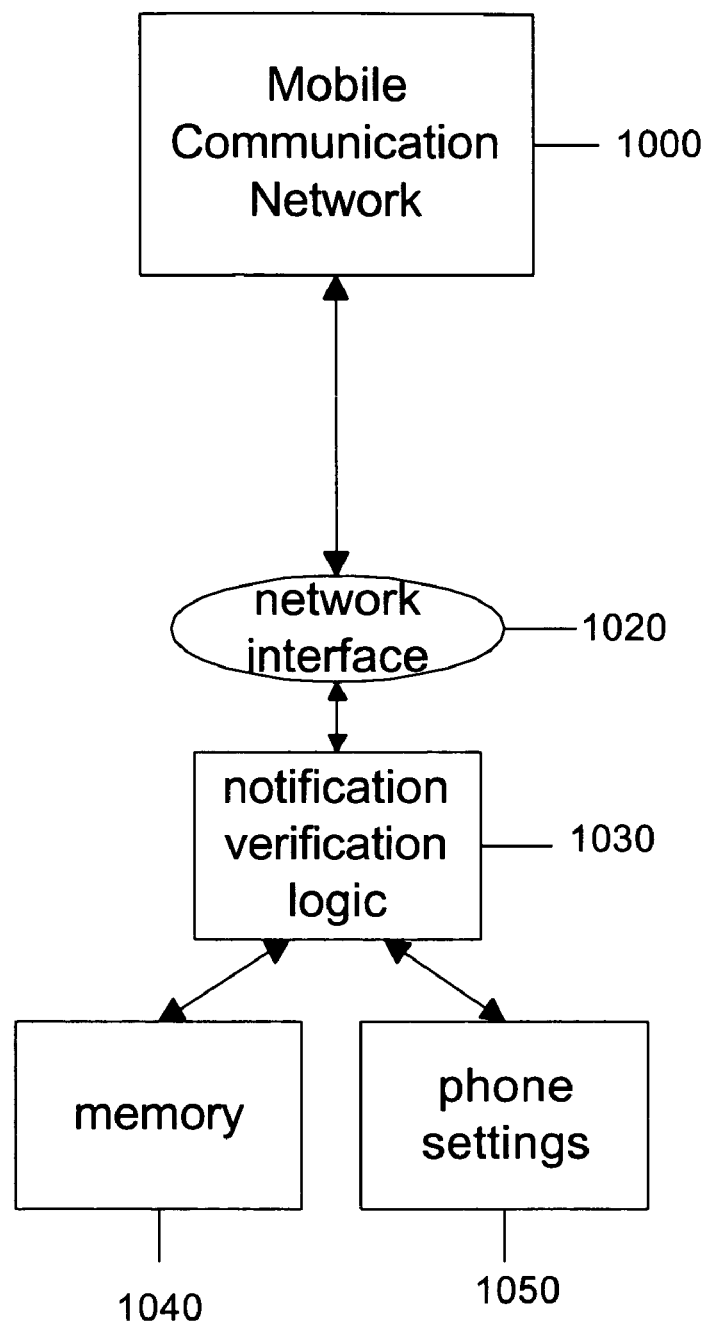
FIG. 10 illustrates one embodiment of the flow in the recipient device.

FIG. 10 illustrates one embodiment of the flow in the recipient device when a "pick up" message is received. In one embodiment, the network interface 1020 connects the recipient device 1010 to the mobile communication network 1000. In one embodiment, when an incoming call with a "pick up" is received by the network interface 1020, the notification verification logic 1030 checks the setting of the recipient device 1050 and looks up the name of the notification in the recipient device's memory module 1040.

The recipient device 1010, in one embodiment, may be set by the user to reject all call originator selected notifications, call originator selected notification by certain callers, or call originator selected notifications of certain types. The notification verification logic 1030 would then tell the network interface 1020 to reject the "pick up" message. In one embodiment, the rejection can be in the form of a SMS message. In another embodiment, the rejection can be in the form of a time out. For example, if the recipient device 1010 does not acknowledge the "pick up" before a preset time, the mobile communication network 1000 will consider the recipient device to have rejected the SMS "pick up" message.

In one embodiment, the memory module 1040 contains previously downloaded call originator selected notifications. In one embodiment, when recipient device 1010 is set to accept call originator selected notifications, the notification verification logic 1030 will extract the unique notification ID from the message and determine whether the notification is already in the memory module 1040. In one embodiment, if the notification ID is located in the memory module 1040, the notification verification logic 1030 will inform the network interface 1020 to reject the "pick up" message.

In one embodiment, if the recipient device 1010 acknowledges the "pick up" message, the mobile communication network 1000 initiates the download of the notification file. The notification verification logic 1020, in one embodiment, also determines whether the elapsed time since download began is greater than a preset time. In one embodiment, the user may set up a "screening function." A screening function displays the downloaded notification to the user, prior to playing the notification for a call. If the user approves the notification, it is stored. Otherwise, it is deleted. The user may furthermore set a flag to note that the rejected notification should not be accepted in the future. The call originator selected notification is played or displayed once the notification is downloaded, and approved if appropriate.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
   a notification insertion logic to send a notification that is selected by a caller for a recipient, wherein the caller selected notification announces an incoming call to the recipient, identifies the caller to the recipient, and comprises one or more of a photo, animation, graphic, audio data, multimedia data or video data;
   a call router in a server to send a message to a recipient device notifying the recipient of the caller selected notification; and the call router in the server further to receive an acknowledgement from a notification verification logic in the recipient device indicating that the recipient device does not already have the caller selected notification stored in memory, and the notification insertion logic to deliver the caller-selected notification to the recipient device in response to receiving the acknowledgement, wherein if the delivery does not finish before a preset period has elapsed, playing a normal ringtone by the recipient device, and finishing delivery of the caller-selected notification onto the recipient device for storage by the recipient device for future use.

2. The system of claim 1, wherein the audio data comprises a caller voice recording, a computerized voice recording, or a ringtone.

3. The system of claim 1, wherein the caller selected notification is associated with one or more telephone numbers.

4. The system of claim 1, wherein the caller selected notification is stored on the caller's device or uploaded onto a web interface.

5. The system of claim 1, wherein the caller selected notification is captured directly onto the caller device or by other digital medium and transferred onto the caller device.

6. The system of claim 1, further comprising:
a web interface to upload and manage notifications and associated phone numbers.

7. The system of claim 6, wherein data from the web interface is uploaded to a customer profile database.

8. The system of claim 1, further comprising:
an internal notification database to store a concatenated notification file, for forwarding to the recipient device.

9. A method comprising:
enabling a caller to select a notification for a particular recipient device, wherein the caller-selected notification identifies the caller to a recipient and comprises one or more of a photo, animation, graphic, audio data, multimedia data or video data;
sending, by the server, a message to the recipient device notifying the recipient of the caller-selected notification; and
delivering, by the server, the caller-selected notification via a mobile communication network to the recipient device in response to receiving an acknowledgement message from the recipient device, wherein the acknowledgement message indicates that the recipient device does not already have the caller-selected notification identifying the caller, wherein when the delivery does not finish before a preset period has elapsed, the recipient device uses another ringtone, and the caller-selected notification is stored by the recipient device for future use.

10. The method of claim 9, wherein selecting audio data comprises of selecting a caller voice recording.

11. The method of claim 9, wherein selecting the one or more of a photo, animation, graphic, audio data, multimedia data or video data comprises:
capturing one or more of a caller voice, photo, animation, graphic, audio data, multimedia data, or video data;
associating the notification with one or more phone numbers in the caller's phone book; and
synchronizing the caller device with the mobile communication network.

12. The method of claim 11, wherein capturing one or more of a caller voice, photo, animation, graphic, audio data, multimedia data or video data comprises:
capturing the notification directly onto the caller device; or capturing the notification onto other digital media and transferring the notification to the caller device.

13. The method of claim 11, wherein synchronizing the caller device with mobile communication network comprises:
comparing current mobile communication network customer profile with the caller's phone book;
uploading any new notifications to mobile communication network;
updating a customer profile to reflect new associations.

14. The method of claim 9, wherein selecting one or more of a photo, animation, graphic, audio data, multimedia data or video data comprises:
capturing one or more of a caller voice, photo, animation, graphic, audio data, multimedia data or video data;
uploading the notification to a website;
associating the notification with phone numbers stored in a customer profile;
saving a new customer profile to mobile communication network.

15. The method of claim 9, wherein delivering a caller-selected notification via a mobile communication network to a recipient device comprises:
sending a "pick up" notification through short message service (SMS) to the recipient device;
transferring the caller-selected notification from the mobile communication network to the recipient device via the recipient's web browser;
storing the caller-selected notification on the recipient device for future use.

16. The method of claim 15, wherein transferring the caller-selected notification from the mobile communication network to the recipient device via the recipient's web browser comprises:
determining whether the recipient device has rejected the caller-selected notification.

17. The method of claim 9, wherein selecting a notification by the caller comprises capturing one or more of a photo, animation, graphic, audio data, multimedia data or video data.

18. The method of claim 17, wherein selecting audio data comprises of:
recording a voice recording;
selecting a recipient from the caller device phone book; and
placing a call to the recipient with the voice recording as the incoming call notification and identifier of the caller.

19. The method of claim 17, wherein selecting one or more of a photo, animation, graphic, multimedia data or video data comprises of:
capturing a visual image, wherein the visual image is at least one of a photo, animation, graphic, multimedia data or video data;
selecting a recipient from the caller device phone book; and
placing a call to the recipient with the visual image as the incoming call notification and identifier of the caller.

20. A device of a recipient of a call comprising:
a notification verification logic module to receive a message that a caller originated notification is available, to determine whether the device already has the caller originated notification identifying the caller in memory, to send an acknowledgement that indicates that the recipient device does not already have the caller originated notification stored in memory, and to initiate download of the caller-selected notification;
a memory to store caller originated notifications sent by a caller to the device of the recipient for future use when the device receives a call from the caller, wherein the caller originated notifications comprises one or more of a photo, animation, graphic, audio data, multimedia data or video data; and a notification selector to select a notification to use, when the recipient device receives the call, the notification selector to determine whether there is a caller originated notification associated with the call, and if so, using the caller originated notification to announce the call and to identify the caller to the call recipient, if the caller originated notification has not completed download within a preset period of time the notification selector to select another notification.

21. The device of claim 20 further comprising:

the notification verification logic module to initiate download of the caller-selected notification;

the notification selector further to play a normal notification when the download of the caller-selected notification does not finish before a preset period has elapsed; and the notification verification logic module to finish the download of the caller-selected notification onto the recipient device and store for future use.

22. A system comprising:

an interface to enable a caller to specify a notification to be used when the caller places a call to a recipient, wherein the specified notification announces the call to the recipient and identifies the caller to the recipient;

a notification insertion logic coupled to the interface to send the specified notification to a call router;

a call router coupled to the notification insertion logic to send a message to a recipient device notifying the recipient of the specified notification, and to receive an acknowledgement from the recipient device, wherein the acknowledgement indicates that the recipient device does not already have the specified notification; and a notification verification logic in the recipient device to determine whether the recipient device already has the specified notification stored in memory, to send an acknowledge when the specified is not stored in memory and to send a rejection when the specified notification is stored in memory, and to initiate download of the caller-selected notification, wherein if the download does not finish before a preset period has elapsed, playing a normal ringtone and finishing download of the caller-selected notification onto the recipient device to store for future use.

* * * * *